Aug. 6, 1940.   F. H. ROHR   2,210,128
DRILL BUSHING DEVICE
Filed March 7, 1939
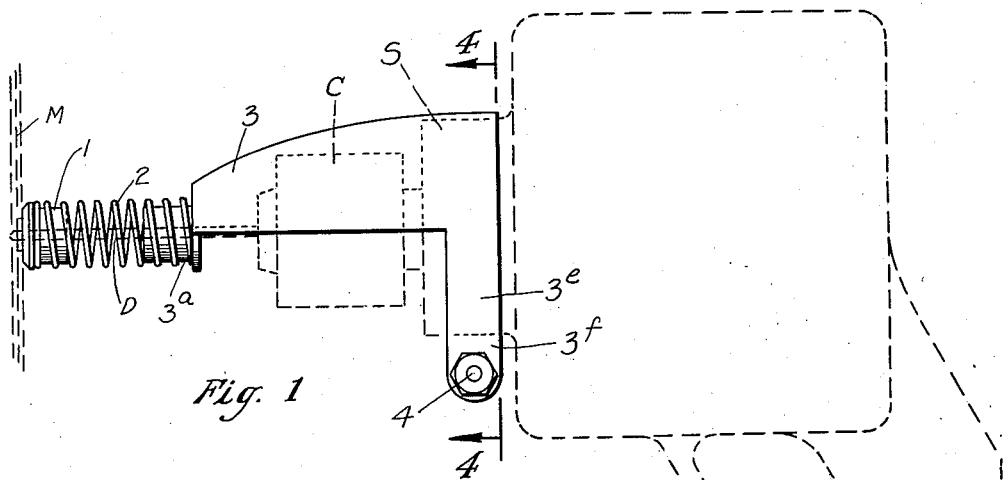
Fig. 1
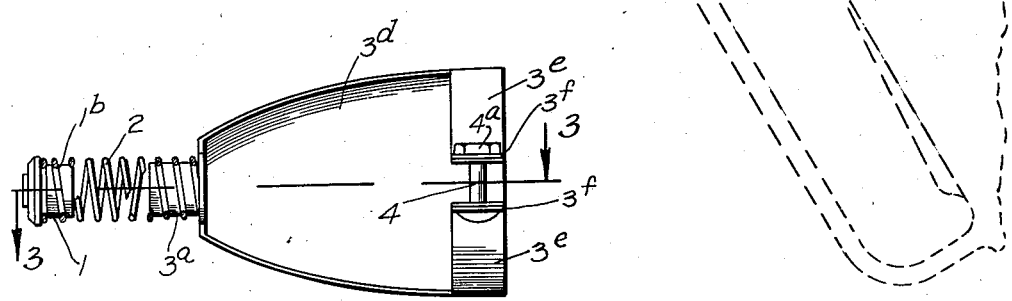
Fig. 2
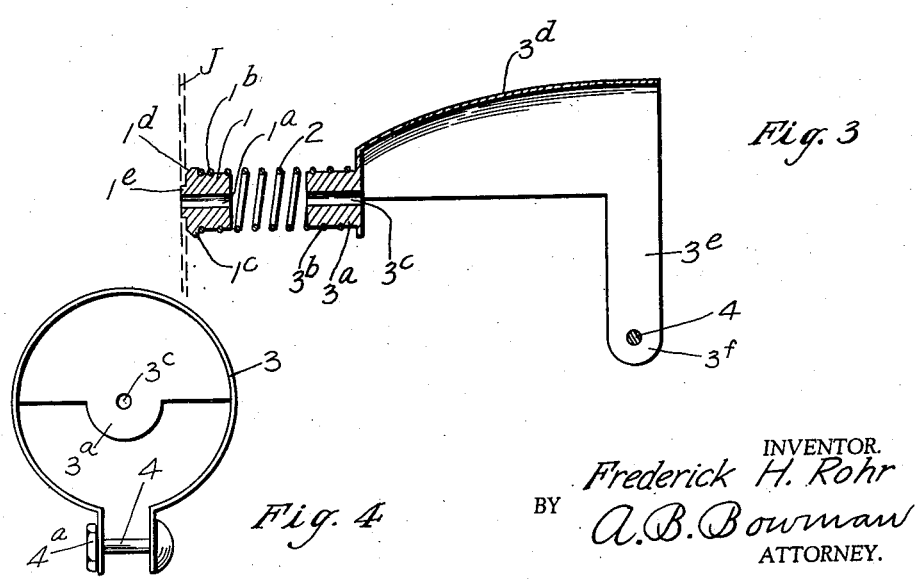
Fig. 3
Fig. 4
INVENTOR.
Frederick H. Rohr
BY A. B. Bowman
ATTORNEY.

Patented Aug. 6, 1940

2,210,128

UNITED STATES PATENT OFFICE 2,210,128

DRILL BUSHING DEVICE

Frederick H. Rohr, Mission Beach, Calif., assignor of one-half to The Ryan Aeronautical Co., San Diego, Calif., a corporation of California Application March 7, 1938, Serial No. 194,422

5 Claims. (Cl. 77—55)

My invention relates to a drill bushing device to be used in connection with jigs or drill forms particularly adapted for drilling plate material and the objects of my invention are:

First, to provide a drill bushing means of this class which greatly facilitates the drilling of holes with the use of jigs or hole drilling forms to be used in connection with electric drill machine or the like;

Second, to provide a drill bushing device of this class in which the bushing is yieldably held so that it may be easily and quickly inserted in the hole in the jig or drill form and will yield to permit the drill to be pressed into the material to be drilled;

Third, to provide a device of this class with means for readily clamping and securing the device onto the shank of an electric drill or the like;

Fourth, to provide a device of this class in which the bushing is yieldably mounted both longitudinally and laterally;

Fifth, to provide a device of this class in which the wear on the bushing which fits into the jig or form will have a minimum of wear; and Sixth, to provide a device of this class which is very simple and economical of construction, easy to operate, easy to install for use, efficient in its action, and which will not readily deteriorate or get out of order.

With these and other objects in view as will appear hereinafter, my invention consists of certain novel features of construction, combination, and arrangements of parts and portions as will be hereinafter described in detail and be particularly set forth in the appended claims, reference being had to the accompanying drawing, and to the characters of reference thereon which form a part of this application in which:

Figure 1 is a side elevational view of my drill bushing device shown installed on an electric drill shown in dotted lines and shown in connection with a jig or drill form and the plate material to be drilled shown in dash lines; Fig. 2 is a side elevational view of the device alone at right angles to that of Fig. 1 and showing the spring slightly broken away and in sections to facilitate the illustration; Fig. 3 is a sectional view from the line 3—3 of Fig. 2; Fig. 4 an end view of the device taken from the line 4—4 of Fig. 1.

Similar characters of reference refer to similar parts and portions throughout the several views of the drawing:

The bushing member 1, spring 2, clamp support 3, and clamp bolt 4, constitute the principal parts and portions of my drill bushing device.

The bushing member 1 is a cylindrical member provided with a drill guiding hole 1a therethrough. It is provided with a spiral groove 1b therein adapted to receive the convolutions of the one end of the spring 2 shown best in Figs. 2 and 3 of the drawing. It is provided with an enlarged shoulder portion 1c against which one end of the spring 2 is supported. This enlarged portion is beveled at its forward side at 1d and it is provided with an extended bushing portion 1e which is adapted to fit into the holes prepared in the jig or drill form J shown by dash lines in Figs. 1 and 3 of the drawing.

The spring 2 is sufficiently rigid to suitably support the bushing member 1; that is, sufficiently yieldable to permit the drill to be pressed into the material to be drilled and also to permit the ready placing of the portion 1e into the hole in the jig for starting and guiding the drill. The opposite end of the spring 2 is supported on a lug 3a by means of spiral grove 3b in the outer side of said lug. This lug is provided with a bore 3c for guiding the drill and through which the drill is operated. It will be noted that the spring is of sufficient length to permit considerable space between the members 1 and 3a so that holes may be drilled through material of considerable thickness if desired. This bushing 3a is supported preferably in integral relation with a casing portion 3d which is preferably thin plate and formed to fit around the shank S and the drill coupling C as shown best in Fig. 1 of the drawing and the drill D passes through the bores 1a and 3c in the bushing and lug as shown best in Fig. 1 of the drawing.

This member 3d is provided on its larger end with strap portions 3e which are provided with angular lug portions 3f through which is mounted the clamp bolt 4 which is provided with a nut 4a thus providing means for rigidly clamping the member 3d on the shank of the drill or other object used for drilling the holes in the material M, shown by dash lines in Fig. 1 of the drawing.

The operation of my device is as follows: The device is secured by clamping on the shank S of the electric drill as shown in Fig. 1 of the drawing. Then by grasping the handle of the drill, the operator places the bushing portion 1e into the hole in the jig J which has already been placed in proper position in connection with the material M ready for drilling the holes in proper position in the material M. Then the hole is drilled by means of the drill D guided by the bushing 1 and lug 3a, the spring 2 yielding for both positioning the portion 1e in the hole and also for feeding the drill into the material, the spring 2 being sufficiently strong so that it holds the bushing 1 so that it may be readily placed in the hole in the jig J.

Though I have shown and described a particular construction, combination, and arrangement of parts and portions, I do not wish to be limited to this particular construction, combination, and arrangement, but desire to include the combination and arrangement substantially as set forth in the appended claims.

Having thus described my invention, what I claim as new and desire to secure by Letters Patent is:

1. A drill bushing device of the class described consisting of a supporting clamp member provided with an integral drill guiding bushing with a drill guiding bore therein, a spring secured over said bushing and supported thereby and extending therefrom, a drill bushing secured in the extended end of said spring with a drill bore in substantial alignment with the drill bore in said drill guiding bushing and means for clamping said support in position on an electric drill casing shank.

2. A drill bushing device of the class described consisting of a supporting clamp member provided with an integral drill guiding bushing with a drill guiding bore therein, a spring secured over said bushing and supported thereby and extending therefrom, a drill bushing secured in the extended end of said spring with a drill bore in substantial alignment with the drill bore in said drill guiding bushing, means for clamping said support in position on an electric drill casing shank, said drill bushing provided with a reduced extended bushing portion adapted to fit the holes of a jig.

3. A drill bushing device of the class described consisting of a drill bushing, a clamp like support for said drill bushing in spaced relation therewith, yieldable means connecting and wholly supporting said bushing with its support, both said bushing and said support provided with bores for guiding and supporting the drill and means for clamping said support in position on an electric drill casing shank.

4. A drill bushing device of the class described consisting of a clamp support provided with an extended reduced and axially aligned lug portion provided with a drill guiding bore therein and provided on its outer side with a spiral spring supporting groove, a spring mounted thereon with its end convolutions mounted in said groove, a drill bushing provided with spiral grooves adapted to receive the extended end of said spring for yieldably and flexibly supporting said bushing, said bushing provided with a drill guiding bore therethrough.

5. A drill bushing device of the class described consisting of a clamp support provided with an extended reduced and axially aligned lug portion provided with a drill guiding bore therein and provided on its outer side with a spiral spring supporting groove, a spring mounted thereon with its end convolutions mounted in said groove, a drill bushing provided with spiral grooves adapted to receive the extended end of said spring for yieldably and flexibly supporting said bushing, said bushing provided with a drill guiding bore therethrough, said drill bushing provided with an extended reduced lug portion adapted to fit the holes in a jig or drill form.

FREDERICK H. ROHR.